(No Model.)
A. B. SHAW.
METHOD OF MAKING BICYCLE TIRES.
No. 529,142. Patented Nov. 13, 1894.
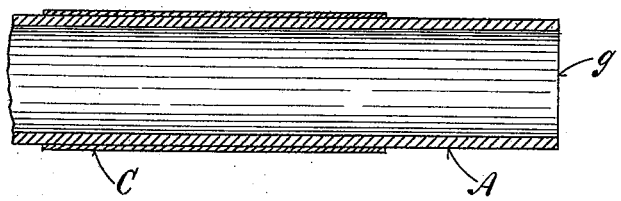
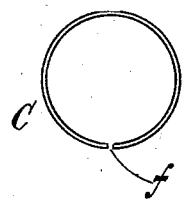
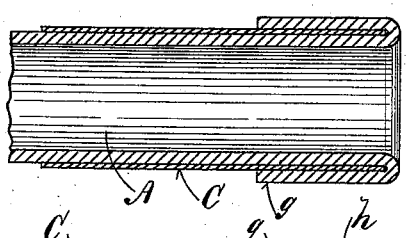
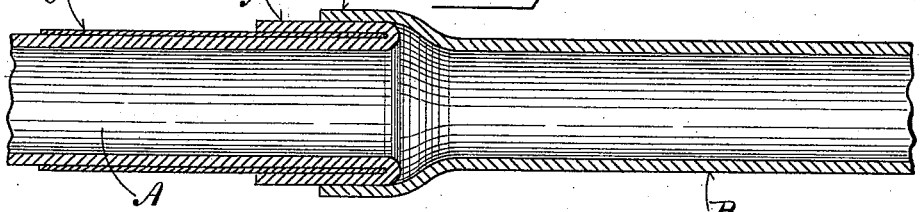
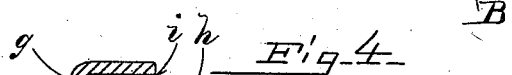
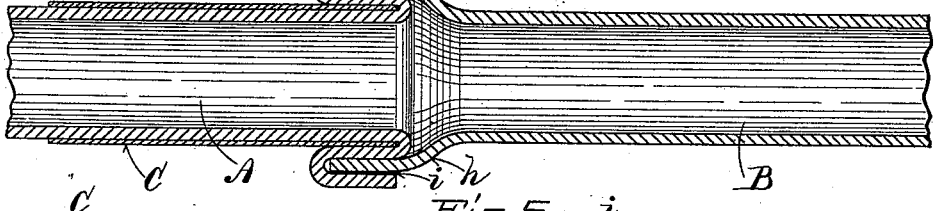
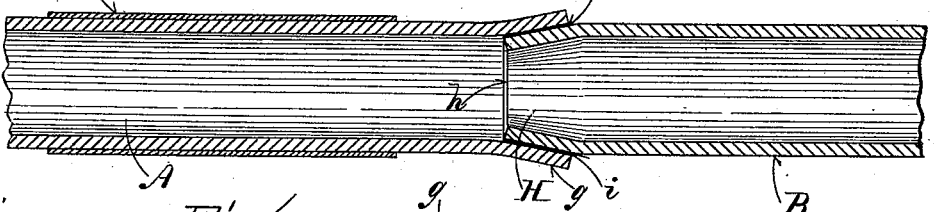
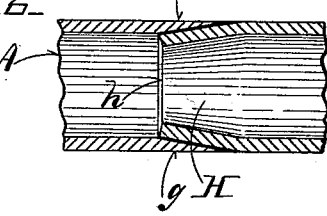

UNITED STATES PATENT OFFICE.

AI B. SHAW, OF MEDFORD, MASSACHUSETTS, ASSIGNOR TO THE SELF-SEALING BICYCLE TIRE COMPANY, OF PORTLAND, MAINE.

METHOD OF MAKING BICYCLE-TIRES.

SPECIFICATION forming part of Letters Patent No. 529,142, dated November 13, 1894.

Application filed March 5, 1894. Serial No. 502,354. (No model.)

*To all whom it may concern:*

Be it known that I, AI B. SHAW, of Medford, in the county of Middlesex, State of Massachusetts, have invented certain new and useful Improvements in Bicycle-Tires and Methods of Making Same, of which the following is a description sufficiently full, clear, and exact to enable any person skilled in the art or science to which said invention appertains to make and use the same, reference being had to the accompanying drawings, forming part of this specification, in which—

Figure 1 is a longitudinal section of a portion of rubber tubing showing the folding tool in position; Fig. 2, a like view showing the end of the tube turned outward over the tool; Figs. 3, 4, and 5, sectional views illustrating steps of the process of the formation of the joint of the tire; Fig. 6, a like view of the finished joint, and Figs. 7 and 8 end elevations of the tool.

Like letters of reference indicate corresponding parts in the different figures of the drawings.

In constructing inflatable tubing for bicycle tires much difficulty is experienced in joining the ends of the tube from which said tire is formed. This is more especially the case where an upset or contracted ply or layer of rubber is applied to the inner face of the tube; the body of the tube being in its normal condition, as in the construction of that class of tires known as self-sealing tires. This difficulty arises from the fact that in forming the joints it is necessary to telescope or overlap the ends of the tube and cement them together.

In the class of tires specified where the contracted ply is used said ply causes the ends to cockle and when overlapped it is only with extreme difficulty that an air-tight joint can be formed as the cement will not take on the entire surface equally and the cockling or distortion of the tube renders it troublesome to manipulate. It is impracticable to hold the end of the tube in shape by a former as such former would have of necessity to remain within the tube and would interfere seriously with its elasticity.

My invention is designed particularly to overcome these and other objections and in carrying it out I make use of means which will be readily understood by all conversant with such matters from the following explanation.

In the drawings, A B represent the ends respectively of the rubber tubing from which the tire is formed. In joining these ends I encircle one as A thereof with a cylinder, C, of tin or similar flexible metal, said cylinder being split longitudinally at, *f*. (See Fig. 7.) This cylinder is disposed an appreciable distance from the extreme end, *g*, of the tube which is turned inside out and folded backward over the cylinder, C, as in Fig. 2, said cylinder being of sufficient rigidity to support said tube in this position. I then take the opposite end, B, of the tube and draw its mouth, *h*, over the folded companion end, *g*, about half the length of said end, *g*, as in Fig. 3. The cement, *i*, is now applied to the outer face of the tube mouth, *h*, and the end, *g*, is bent again backward or outward onto said cemented portion as in Fig. 4 so that now outside of the cylinder, C, there are three thicknesses of tubing between which and the body of the tubing said cylinder is interposed. As soon as the cement has set the operator grasps the end, B, of the tube and draws the overlapped ends out the joint, H, now assuming the form shown in Fig. 5. The cylinder or tool, C, is now spread and removed from the tube end A, and the joint, H, then finished by chamfering or rubbing down the outer surface of its mouth, *g*, until the tube is substantially of the same exterior diameter as the other portions of said tube.

I do not confine myself to using a cylinder, C, of flexible metal, as tin, as any material formed in two sections hinged together as in Fig. 8, may be employed to construct a cylinder, D, which will embrace an end of the tube and readily open.

Having thus explained my invention, what I claim is—

1. That improvement in the method of constructing inflatable tubing for bicycle tires, which comprises inclosing one end of the tube in a detachable cylinder of sufficient rigidity to hold the shape; turning the end of said tube inside out and backward over said cylinder; inserting a portion of the end thus folded into the companion end of the tube, again turning said folded end outward over said companion end and cementing these parts together, the plies thus formed being outside said cylinder, then withdrawing the plies or folds from said cylinder and removing the cylinder, substantially as described.

2. That improvement in forming the joint between the ends of a flexible tubing for pneumatic tires which comprises turning one end of the tube inside out over a form, drawing the companion end of the tube over said folded portion; again turning the folded end of the tube over the companion end and cementing the parts together.

AI B. SHAW.

Witnesses:
K. DURFEE,
O. M. SHAW.